US006757739B1

(12) United States Patent
Tomm et al.

(10) Patent No.: US 6,757,739 B1
(45) Date of Patent: Jun. 29, 2004

(54) METHOD AND APPARATUS FOR AUTOMATICALLY CONVERTING THE FORMAT OF AN ELECTRONIC MESSAGE

(75) Inventors: Douglas Cameron Tomm, Milpitas, CA (US); Donald Albert Leckie, Merrimack, NH (US)

(73) Assignee: Contivo, Inc., Mountain View, CA (US)

( * ) Notice: Subject to any disclaimer, the term of this patent is extended or adjusted under 35 U.S.C. 154(b) by 626 days.

(21) Appl. No.: 09/588,270

(22) Filed: Jun. 5, 2000

(51) Int. Cl.[7] .......................... G06F 15/16; G06F 17/30
(52) U.S. Cl. ........................ 709/236; 709/207; 707/102
(58) Field of Search ............................. 709/206, 207, 709/203, 236, 246; 707/10, 101, 102

(56) References Cited

U.S. PATENT DOCUMENTS

| | | | |
|---|---|---|---|
| 5,708,828 A | | 1/1998 | Coleman |
| 5,715,397 A | | 2/1998 | Ogawa et al. |
| 5,794,234 A | | 8/1998 | Church et al. |
| 5,822,526 A | * | 10/1998 | Waskiewicz ............... 709/206 |
| 5,905,862 A | * | 5/1999 | Hoekstra .................... 709/202 |
| 5,909,570 A | | 6/1999 | Webber |
| 6,014,711 A | * | 1/2000 | Brown ....................... 709/245 |
| 6,032,147 A | | 2/2000 | Williams et al. |
| 6,163,809 A | * | 12/2000 | Buckley .................... 709/237 |
| 6,356,633 B1 | * | 3/2002 | Armstrong ............. 379/265.11 |
| 6,385,568 B1 | * | 5/2002 | Brandon et al. ............... 704/7 |
| 6,463,404 B1 | * | 10/2002 | Appleby ........................ 704/9 |
| 6,560,608 B1 | * | 5/2003 | Tomm et al. ............... 707/102 |

FOREIGN PATENT DOCUMENTS

| | | |
|---|---|---|
| EP | 0454303 A2 | 10/1991 |
| WO | WO 98/56024 | 12/1998 |

OTHER PUBLICATIONS

Anonymous, "Generic Database Interface", Kenneth Mason Publications, Hampshire, G.B., No. 318, p. 794, Oct. 1990, XP 000148635.

J. Liang et al., "Synthesis of Consolidated Data Schema for Engineering Analysis From Multiple STEP Application Protocols", Computer Aided Design 31, Elsevier Publishers B.V., Barking, G.B., pp. 429–447, 1999.

* cited by examiner

*Primary Examiner*—Zarni Maung
(74) *Attorney, Agent, or Firm*—Blakely, Sokoloff, Taylor & Zafman LLP

(57) ABSTRACT

A method and apparatus to automatically map between disparate message formats are provided. In one embodiment, the mapping begins by message selecting a target field in a target business object. A concept associated with the target field is identified in a synonym dictionary. A set of synonyms associated with the concept is received. In the source document, fields are identified which contain synonyms that match the synonyms in the target field. For those source fields that match the target field, a match exists and the fields are said to be mapped.

8 Claims, 5 Drawing Sheets

SYNONYM
DICTIONARY 335

| CONCEPT 410 | SYNONYM FIELDS 420 |
|---|---|
| NAME 415 | {EDI.NAME, XML.REQUISITION} 425 |
| COUNT 417 | {EDI.QUANTITY, XML.NUMBER} 427 |

FIG. 4

METHOD AND APPARATUS FOR AUTOMATICALLY CONVERTING THE FORMAT OF AN ELECTRONIC MESSAGE

FIELD OF INVENTION

This invention is related generally to processing data with computers, and in particular to converting data from one format to another.

BACKGROUND OF THE INVENTION

Two organizations, such as a company and a supplier, that wish to conduct business with one another electronically can send electronic messages to each other. However, each company may use different message formats. In this case, the messages sent by the company to its supplier will not be understood. Therefore, if the company message is in a format that is not used by the supplier, a mechanism is needed to translate the messages from one format to another. The set of rules for doing such a translation is called a map.

Electronic messages are composed of discrete data elements called fields. A map is used to describe how the fields of one message (the source) are transformed into the fields of another (the target). Traditionally, maps had to be developed manually by experts, such as business analysts, by documenting the field names used in the electronic message, such as an Excel spreadsheet, for example. Traditional software tools can only do mappings in cases where the field names are identical.

The two message types may be so different that relationships between their fields are not deduced by a mapping tool using previous techniques. Therefore, the maps may be incomplete or even incorrect. For example, when traditional software tools try to match identical field names in the source and the target, the software tools produced incorrect associations, and miss many associations. A human operator must intervene in the mapping process to correct flaws in the traditionally generated map. Thus, this prior approach is inadequate because textual matching of field names yields some false matches, and causes many missed associations that have to be mapped by a human. Alternatively, a human expert such as a business analyst must refer to the documentation on each business document and manually map fields in the source and target message. This human expert-based process is extremely slow even for a single map.

Therefore, there are several disadvantages with the previous methods. When a company has one document that needs to map to multiple trading partners, the company needs to perform the manual mapping for each format used by each trading partner. Also, companies usually need to manually map multiple documents to their trading partners formats using traditional methods. Furthermore, trading partners need to map back to the first company using traditional methods. The time and expense of using human experts to perform or intervene in the mapping may be prohibitive, and grows exponentially as the number of trading partners increases, and is also very slow.

SUMMARY OF THE INVENTION

A method and apparatus to automatically map between disparate message formats are provided. In one embodiment, the mapping begins by message selecting a target field in a target business object. A concept associated with the target field is identified in a synonym dictionary. A set of synonyms associated with the concept is received. In the source document, fields are identified which contain synonyms that match the synonyms in the target field. For those source fields that match the target field, a match exists and the fields are said to be mapped.

BRIEF DESCRIPTION OF THE DRAWINGS

The present invention is illustrated by way of example and not limitation in the figures of the accompanying drawings, in which like references indicate similar elements, and in which:

FIG. 4 is an example of a synonym dictionary.

DETAILED DESCRIPTION

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims.

Hardware Overview

According to the present invention, a host computer system transmits and receives data over a computer network or standard telephone line. According to one embodiment, the steps of accessing, downloading, and manipulating the data, as well as other aspects of the present invention are implemented by a central processing unit (CPU) in the host computer executing sequences of instructions stored in a memory. The memory may be a random access memory (RAM), read-only memory (ROM), a persistent store, such as a mass storage device, or any combination of these devices. Execution of the sequences of instructions causes the CPU to perform steps according to the present invention.

The instructions may be loaded into the memory of the host computer from a storage device, or from one or more other computer systems over a network connection. For example, a server computer may transmit a sequence of instructions to the host computer in response to a message transmitted to the server over a network by the host. As the host receives the instructions over the network connection, it stores the instructions in memory. The host may store the instructions for later execution or execute the instructions as they arrive over the network connection. In some cases, the downloaded instructions may be directly supported by the CPU. In other cases, the instructions may not be directly executable by the CPU, and may instead be executed by an interpreter that interprets the instructions. In other embodiments, hardwired circuitry may be used in place of, or in combination with, software instructions to implement the present invention. Thus, the present invention is not limited to any specific combination of hardware circuitry and software, nor to any particular source for the instructions executed by the host computer.

Figure 1:
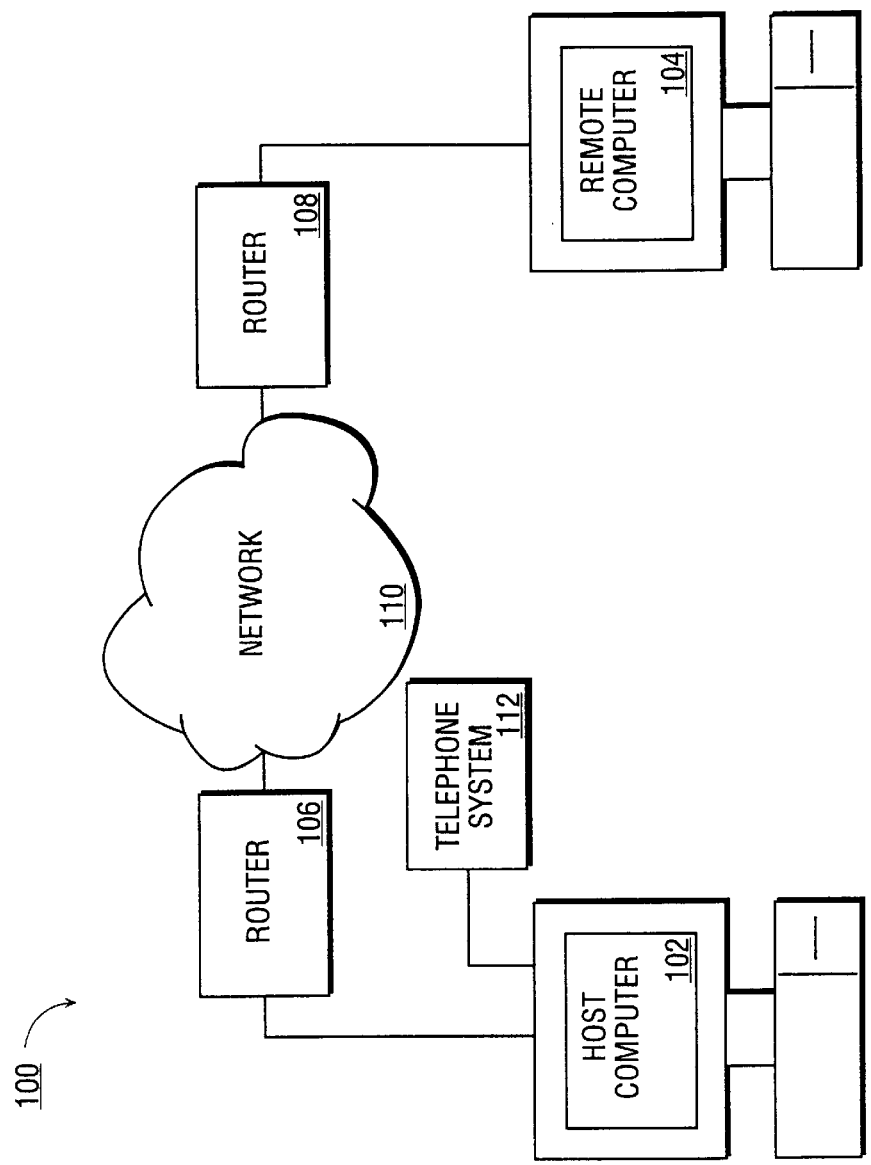
FIG. 1 illustrates host and remote computers connected over a network.

FIG. 1 illustrates a system 100 in which a host computer 102 is connected to a remote computer 104 through a network 110. The network interface between host computer 102 and remote 104 may also include one or more routers, such as routers 106 and 108, which serve to buffer and route the data transmitted between the host and client computers. Network 110 may be the Internet, a Wide Area Network (WAN), a Local Area Network (LAN), or any combination thereof. The remote computer 104 may be a World-Wide Web (WWW) server that stores data in the form of 'web pages' and transmits these pages as Hypertext Markup Language (HTML) files over the Internet network 110 to host computer 102. To access these files, host computer 102 runs a 'web browser', which is simply an application program for accessing and providing links to web pages available on various Internet sites. Host computer 102 is also configured to communicate to telephone system 112 through a telephone interface, typically a modem.

Figure 2:
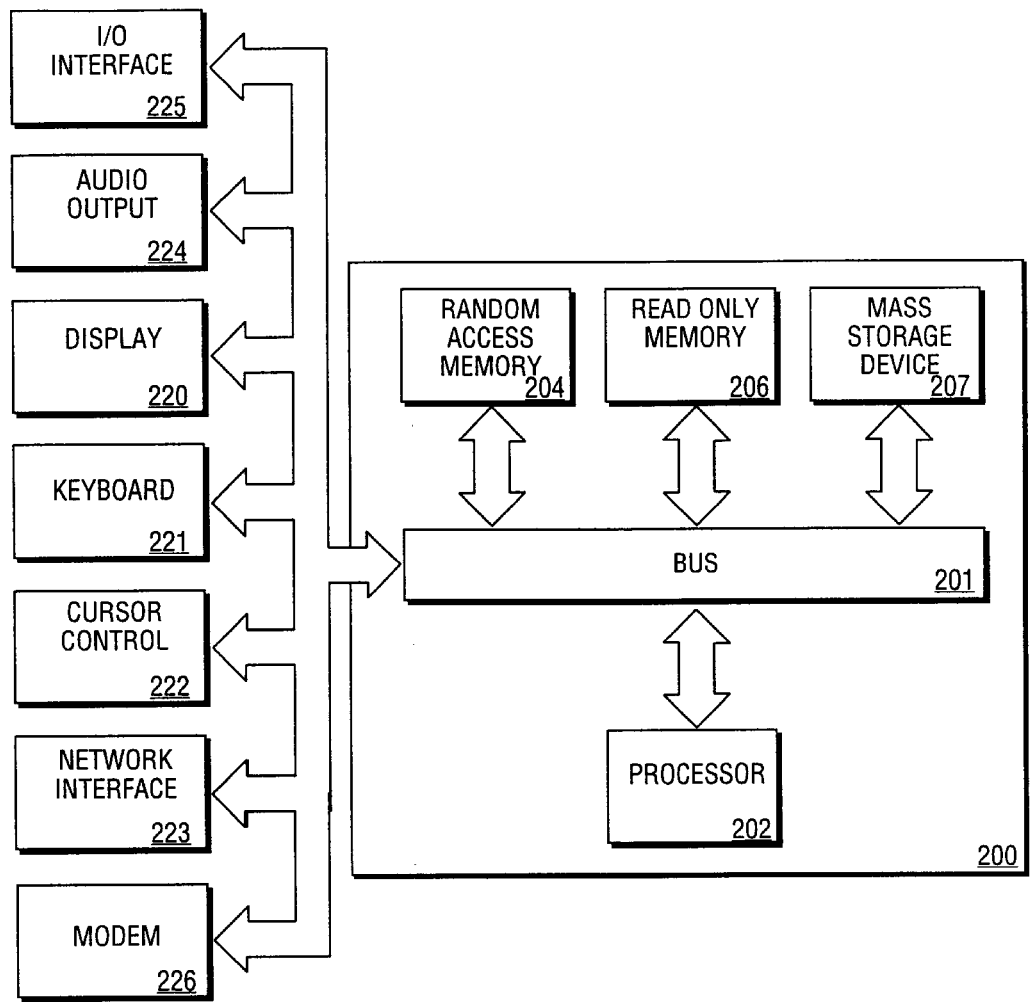
FIG. 2 is a block diagram of a host computer system which may be used to implement an embodiment of the present invention.

FIG. 2 is a block diagram of a representative networked computer, such as host computer 102 illustrated in FIG. 1. The computer system 200 includes a processor 202 coupled through a bus 201 to a random access memory (RAM) 204, a read only memory (ROM) 206, and a mass storage device 207. Mass storage device 207 could be a disk or tape drive for storing data and instructions. A display device 220 for providing visual output is also coupled to processor 202 through bus 201. Keyboard 221 is coupled to bus 201 for communicating information and command selections to processor 202. Another type of user input device is cursor control unit 222, which may be a device such as a mouse or trackball, for communicating direction commands that control cursor movement on display 220. Also coupled to processor 202 through bus 201 is an audio output port 224 for connection to speakers that output audio signals produced by computer 200.

Further coupled to processor 202 through bus 201 is an input/output (I/O) interface 225, and a network interface device 223 for providing a physical and logical connection between computer system 200 and a network. Network interface device 223 is used by various communication applications running on computer 200 for communicating over a network medium and may represent devices such as an ethernet card, ISDN card, or similar devices.

Modem 226 interfaces computer system 200 to a telephone line and translates digital data produced by the computer into analog signals that can be transmitted over standard telephone lines, such as by telephone system 112 in FIG. 1. In an embodiment of the present invention, modem 226 provides a hardwired interface to a telephone wall jack, however modem 226 could also represent a wireless modem for communication over cellular telephone networks. It should be noted that the architecture of FIG. 2 is provided only for purposes of illustration, and that a host computer used in conjunction with the present invention is not limited to the specific architecture shown.

The network and computer systems shown in FIGS. 1 and 2 are used by the present invention to automatically convert the format of a first message into the format of a second message. Messages are composed of discrete data elements called fields. A map is a recipe that describes how the fields of one message (the source) are transformed into the fields of another (the target). Different message formats have many abstract concepts in common, even though they may represent these abstractions in different ways. For example, dates and postal addresses are commonly represented in a variety of message formats, where the representation of each format may be different. One advantage of the present invention is to extract these common notions from various message formats. Another advantage of the present invention is providing a database of these common traits, which are called concepts.

Each field in each format is described in a database. The fields are grouped into sets in the database, where each set corresponds to a concept. The database itself is called the synonym dictionary. The set contains every field from all business objects where the corresponding concept is represented. For example, the concept BIRTH_DATE will have a set that contains every field that represents a birth date, from all business objects or message formats. The set of field names associated with the corresponding concept is called the synonym set.

Figure 3:
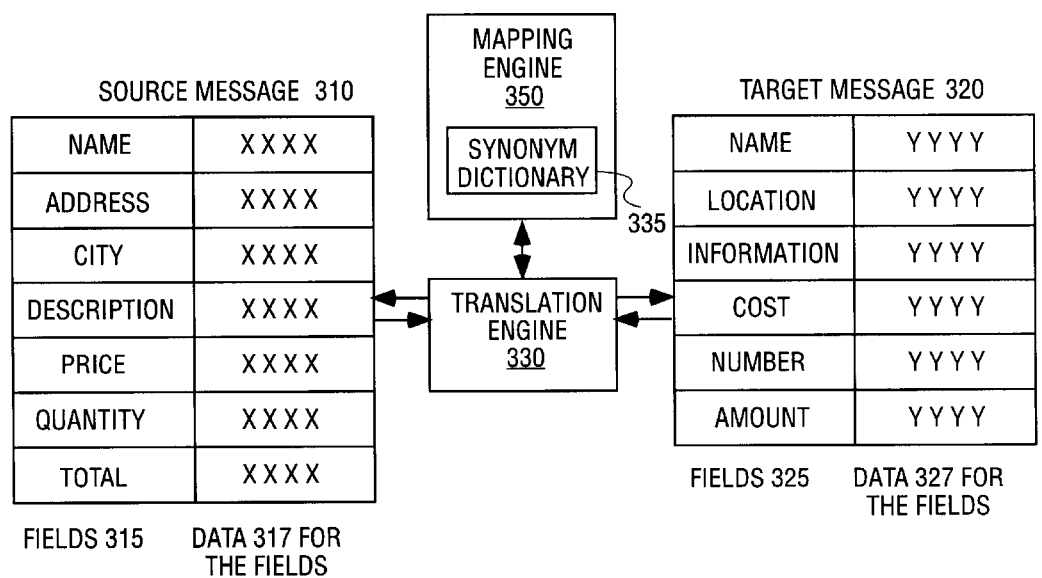
FIG. 3 is an example of a translation for two different message formats.

The synonym dictionary 335 is used by a mapping engine 350 to create a translation map, as shown in FIG. 3. The translation map is used by a translation engine 330 to convert, or translate a message from a source format to a target format.

FIG. 3 shows an example of the fields of two different message formats, a source message format 310 and a target message format 320. In this embodiment, the message is a purchase order. However, the message may convey any information that one person or business wants to send to another person or business. The source fields 315 are name, address, city, description, price, quantity, and total. The target fields 325 are name, location, information, cost, number, and amount. Although the formats of the source and target fields are structurally different, they have similarities and common abstractions such as name, amount, and place to ship the goods. Thus, the names of the fields 315 and 325 may be different, such as "price" and "cost," for example, but the data 317 and 327 contained in these fields is the same.

A synonym dictionary 335 assigns an abstract meaning to the different names of similar fields 315, 325, and to capture this abstract meaning in a set of fields called a concept. Structurally, the synonym dictionary 335 has a list of concepts, as shown in FIG. 4. A set of synonym fields 420 is associated with each concept. Each synonym field corresponds to a data field for a given format. All fields of business objects (e.g., formats or forms), can be associated with corresponding concepts. For example, the synonym field 425 contains the data fields EDI.NAME and XML.REQUISITION. Thus, the concept "NAME" 415 can be mapped onto EDI field "NAME" or XML field "REQUISITION." The business objects can be any kind of business document, such as an order form, a time sheet, or any other type of business form.

After the synonym dictionary is created, it can be used to map each field in one message to a corresponding field in another message. For example, given one target field in the target message, a synonym dictionary is searched for the synonym set in which that field appears. The synonym dictionary guarantees that there is exactly one set that contains the target field. Next, the method iterates over every member of the synonym set, examining every field that appears in the set. If the field is a member of the source message type, then a match between the two fields is identified, and the two matching fields are mapped.

Figure 5:
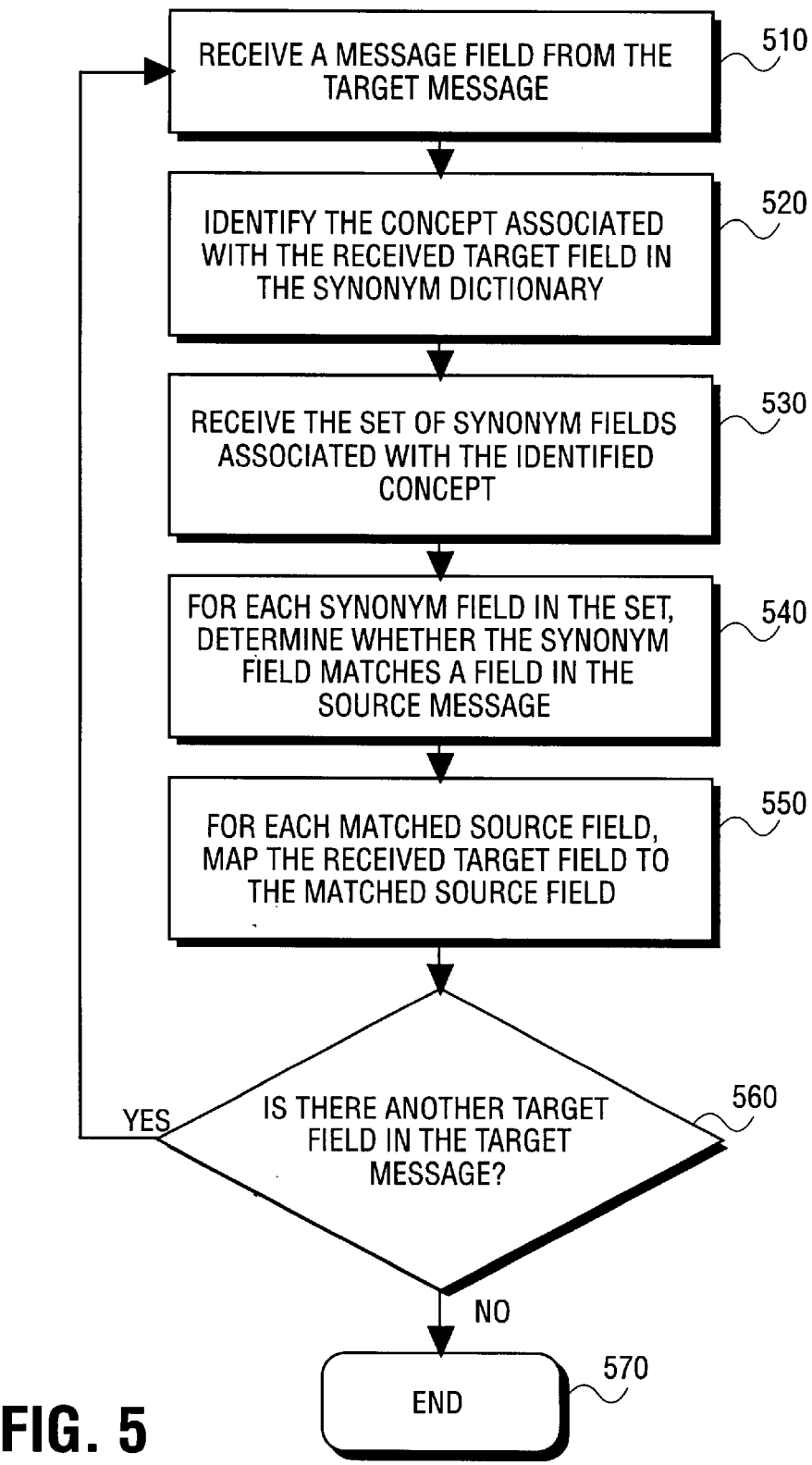
FIG. 5 is a flow diagram of a method for translating from a first format to a second format.

An example of a method for performing an auto-mapping process is shown in FIG. 5. The method shown in FIG. 5 uses the synonym dictionary to convert, or translate, a message from a source format to a target format. A target field in the target message is received, step 510. The concept for the received target field is identified in the synonym dictionary, step 520. The set of synonym fields associated with the identified concept are received, step 530. The method then identifies a field in the synonym set that matches a source field in the source message, step 540. The matched source field is then mapped to the received target field, step 550. The method repeats step for each field in the synonym set. Then, the method is repeated for each field in the target message, step 560.

The method is applied once for each field in the target. The method is applied to each field in the target message type, and works backwards, deriving one or more fields in the source that map to the target.

The method shown in FIG. 5 provides several advantages over the prior art. For example, suppose a user desires to produce two maps, one between message format-types A and B, and another between message format-types A and C. The prior approach requires the user to either create the map between A and C by hand, or to delete the logical associations that have been established for A and B, and create new ones between A and C. Both of these steps require actions to be taken by a user.

In contrast, the method described herein permits logical associations between all of A, B, and C, and allows a user to automatically generate maps between any pair of message format-types without the human intervention steps. This method is far superior to attempting textual matches, because it will not produce wrong associations, and has a much higher success rate in locating matches.

An additional advantage over the prior art is that the prior art uses pattern matching without logical associations. The method disclosed herein uses a synonym dictionary in order to allow the method to work. This synonym dictionary provides expertise in this mapping domain.

The method of the present invention gives maps that are correct, such that the maps require no correction or adjustment by a user. In addition, once a customer describes a business object to the synonym dictionary, he can use that once-for-all description while automatically mapping documents to the business documents of all trading partners, instead of needing to re-do the mapping for each. Each trading partner may also go through the once-for-all description of the business object. The automated method is faster and more accurate than the human-based alternative. Additionally, storing the synonym dictionary in a database rather than on a local disk means that the automated method uses less memory at runtime, because the dictionary does not have to be stored in RAM.

A method and apparatus to automatically map fields between disparate message formats are provided. In the description, numerous details have been set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

In the foregoing specification, the invention has been described with reference to specific exemplary embodiments thereof. It will, however, be evident that various modifications and changes may be made thereto without departing from the broader spirit and scope of the invention as set for in the appended claims. The specification and drawings are, accordingly, to be regarded in an illustrative rather than a restrictive sense.

What is claimed is:

1. A method comprising:
   a) receiving a target field of a target message;
   b) identifying a concept associated with the target field in a synonym dictionary, the synonym dictionary containing a set of synonym fields associated with the concept, each of the synonym fields corresponding to a different one of a plurality of electronic message formats;
   c) identifying at least one synonym field, in the set of synonym fields, which matches a field in a source message; and
   d) mapping the target field to each of the synonym fields which matches the field in the source message.

2. A method as recited in claim 1, wherein the target message contains a plurality of target fields, the method further comprising repeating said a), b), c) and d) for each of the target fields.

3. A method as recited in claim 1, wherein the synonym dictionary contains a plurality of concepts and a separate set of synonym fields for each of the concepts, each synonym field in each set of synonym fields corresponding to a particular electronic message format.

4. An apparatus comprising:
- a synonym dictionary containing a plurality of concepts and a set of synonym fields associated with each concept, each of the synonym fields within each concept corresponding to a different one of a plurality of electronic message formats;
- means for receiving a target field of a target message;
- means for identifying a concept associated with the target field in a synonym dictionary;
- means for identifying at least one synonym field, in the set of synonym fields of the identified concept, which matches a field in a source message; and
- means for mapping the target field to each of the synonym fields which matches the field in the source message.

5. An apparatus as recited in claim 4, wherein the target message contains a plurality of target fields, the apparatus further comprising means for repeating said receiving a target field, said identifying a concept, said identifying at least one synonym field, and said mapping the target field, for each of the target fields.

6. A processing system comprising:
- a processor; and
- a memory containing instructions which, when executed by the processor, cause the processing system to perform a mapping process that comprises
  - a) receiving a target field of a target message,
  - b) identifying a concept associated with the target field in a synonym dictionary, the synonym dictionary containing a set of synonym fields associated with the concept, each of the synonym fields corresponding to a different one of a plurality of electronic message formats,
  - c) identifying at least one synonym field, in the set of synonym fields, which matches a field in a source message, and
  - d) mapping the target field to each of the synonym fields which matches the field in the source message.

7. A processing system as recited in claim 6, wherein the target message contains a plurality of target fields, and wherein the mapping process further comprises repeating said a), b), c) and d) for each of the target fields.

8. A processing system as recited in claim 6, wherein the synonym dictionary contains a plurality of concepts and a separate set of synonym fields for each of the concepts, each synonym field in each set of synonym fields corresponding to a particular electronic message format.

* * * * *